United States Patent
Kuribayashi

(12) 
(10) Patent No.: US 6,816,547 B1
(45) Date of Patent: Nov. 9, 2004

(54) WAVEFORM EQUALIZER

(75) Inventor: Hiroki Kuribayashi, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 662 days.

(21) Appl. No.: 09/704,730

(22) Filed: Nov. 3, 2000

(30) Foreign Application Priority Data

Nov. 4, 1999 (JP) .......................................... 11-314002
Sep. 13, 2000 (JP) ...................................... 2000-277885

(51) Int. Cl.$^7$ ............................................ H03K 5/159
(52) U.S. Cl. ...................................................... 375/229
(58) Field of Search ................................ 375/229–236; 333/18, 28 R

(56) References Cited

U.S. PATENT DOCUMENTS 5,650,988 A * 7/1997 Kuribayashi ............. 369/59.22
6,201,832 B1 * 3/2001 Choi .......................... 375/233

FOREIGN PATENT DOCUMENTS

| EP | 0 940 811 A1 | 9/1999 |
| EP | 1 229 538 A1 | 8/2002 |
| JP | 4-245711 | 9/1997 |
| JP | 9-231200 | 9/1997 |
| JP | 10-31866 | 2/1998 |
| JP | 11-259985 | 9/1999 |

* cited by examiner

Primary Examiner—Stephen Chin
Assistant Examiner—Kevin Kim
(74) Attorney, Agent, or Firm—Sughrue Mion, PLLC

(57) ABSTRACT

A waveform equalizer is designed to perform high frequency enhancement on a read signal without increasing inter symbol interference even when the shortest run length of the read signal is not greater than twice the clock period of the channel clock signal. An addition value of weighted values of signal levels of an amplitude limited read signal obtained by limiting the amplitude of the read signal, where the signal levels are at first and second points of time, is added to a signal level at an intermediate timing of the first and second points of time, and a result of the addition is outputted as an equalization corrected read signal.

31 Claims, 13 Drawing Sheets

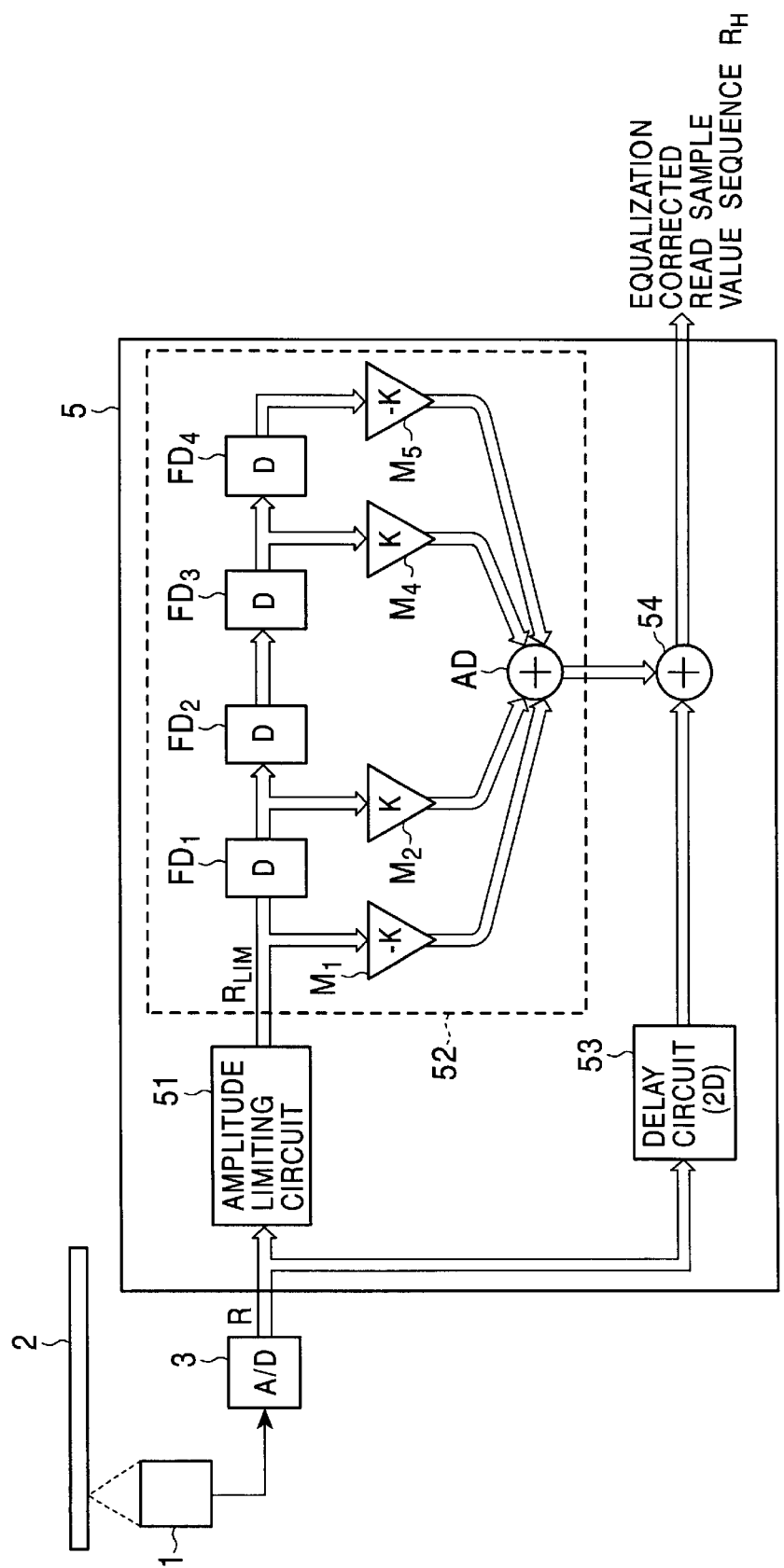

FIG. 8A
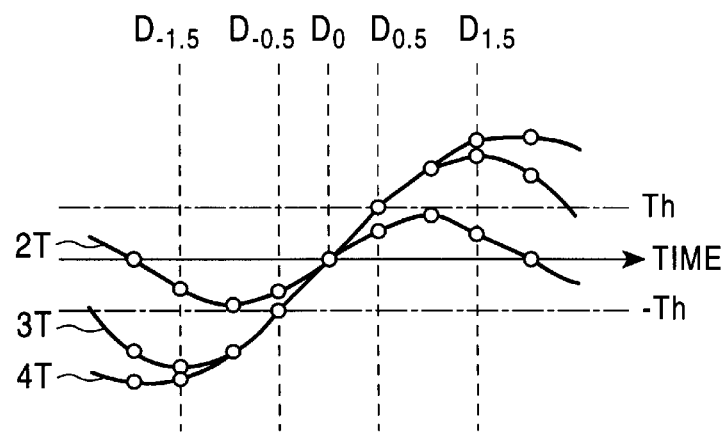
FIG. 8B $R_{LIM}$
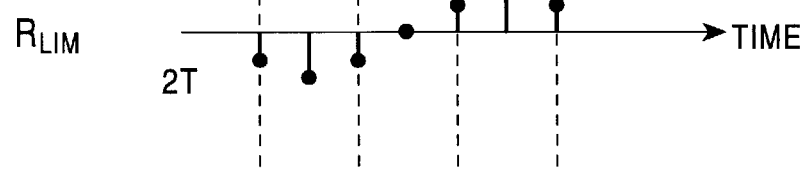
FIG. 8C $R_{LIM}$
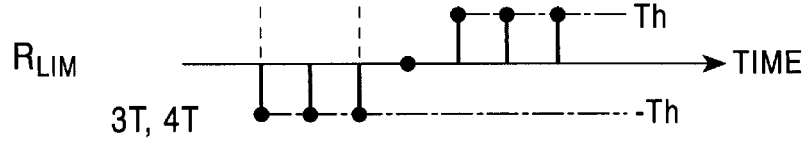

WAVEFORM EQUALIZER

BACKGROUND OF THE INVENTION

1. Field of the Invention

The present invention relates to a waveform equalizer in a recorded information reproduction device for reproducing recorded information from recording media.

2. Description of Related Art

Known is a technique of waveform equalization for improving the S/N ratio of a read signal read from a recording medium on which digital data is recorded at high densities, by performing filtering for strengthening high frequency enhancement on such a read signal. With this technique, the stronger the enhancement of high frequencies of the read signal, the more the S/N ratio can be improved. However, if the high frequencies are strengthened excessively, it will cause an increase in inter symbol interference. To cope with this problem, a waveform equalizer, that can perform high frequency enhancement without causing an increase in inter symbol interference is suggested in Japanese Patent Kokai No. H11-259985.

In such a waveform equalizer, however, a problem exists that a value at the zero-cross point of the read sample value sequence after equalization correction varies when the shortest run length of a read signal is short and thus inter symbol interference is increased, thereby high frequency regions cannot be sufficiently strengthened.

OBJECT AND SUMMARY OF THE INVENTION

The present invention has been developed in order to solve such a problem. An object of the present invention is to provide a waveform equalizer which can strengthen the high frequency enhancement of the read signal without causing an increase in inter symbol interference even when the shortest run length of the read signal is, for example, not greater than twice the clock period of the channel clock signal.

A waveform equalizer according to the present invention is to perform waveform equalization on a read signal obtained by reading information signals stored in a recording medium, to obtain an equalization corrected read signal, the waveform equalizer comprising amplitude limiting means for limiting the read signal with predetermined amplitude limited values in order to obtain a amplitude limited read signal, a filter for respectively weighting a signal level of the amplitude limited read signal at a first point of time and a signal level of the amplitude limited read signal at a second opint of time, adding the weighted signal levels and outputing a filter output signal, and a summing means for obtaining the equalization corrected read signal by adding a sigal level of the read signal at an intermediate timing of the first and second points of time and the filter output signal.

BRIEF DESCRIPTION OF THE DRAWINGS

FIG. 1 is a view showing the configuration of a recorded information reproduction device comprising a waveform equalizer 5;

FIGS. 8A through 8C show the read sample value sequence R which are obtained when information signals recorded by being modulated by (1, 7) are read and the amplitude limited read sample value sequence $R_{LIM}$ which are obtained by the waveform equalizer 6 shown in FIG. 7;

DETAILED DESCRIPTION OF THE EMBODIMENTS

Before the embodiments are explained in detail, problems accompanying a prior waveform equalizer will be explained with reference to the drawings.

FIG. 1 is a view showing the configuration of a recorded information reproduction device comprising the waveform equalizer suggested in Japanese Patent kokai No. 11-259985.

Referring to FIG. 1, a pickup 1 reads an information signal which is modulated by 8/16 and recorded on a recording disc 2 such as a DVD (Digital Versatile Disc) to supply the resulting read signal to an A/D converter 3. The A/D converter 3 samples such read signals at the timing corresponding to a channel clock to supply the read sample value sequence R comprising a series of sample values obtained at this time to a waveform equalizer 5. Incidentally, the aforementioned channel clock has a period of 1T of the information signal modulated by 8/16.

Figure 2A:
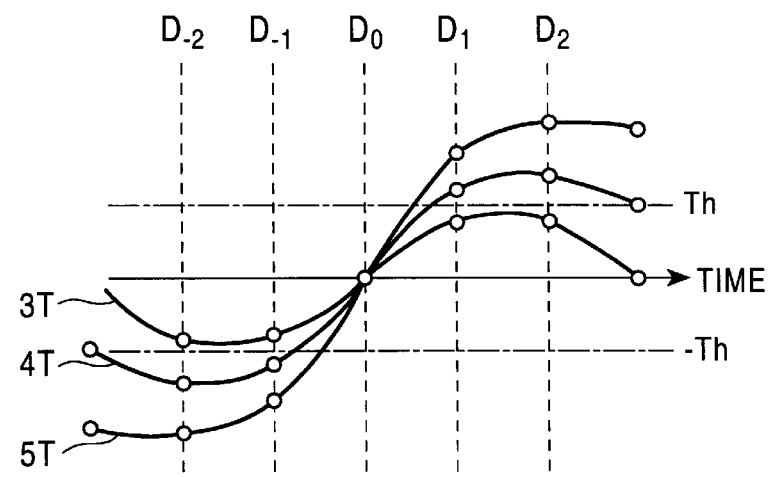
FIGS. 2A through 2C show the read sample value sequence R which are obtained when information signals recorded by being modulated by 8/16 are read and the amplitude limited read sample value sequence $R_{LIM}$ which are obtained by the waveform equalizer 5.
Figure 2B:
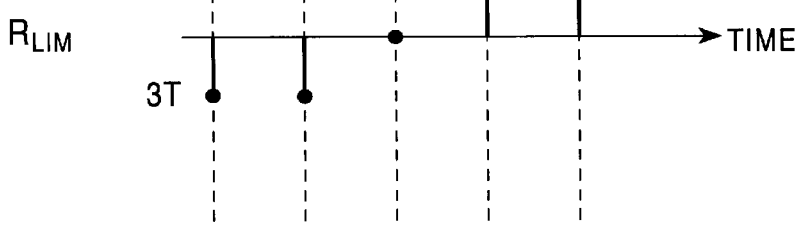
Figure 2C:

An amplitude limiting circuit 51 of the waveform equalizer 5 supplies the amplitude limited read sample value sequence $R_{LIM}$ obtained by limiting the amplitude of the read sample value sequence R with the amplitude limiting values $T_h$ and $-T_h$, shown in FIGS. 2A through 2C to a high frequency enhancing filter 52. That is, when each of the read sample values of the read sample value sequence R lies within the range of the amplitude limiting value $-T_h$ to $T_h$, the amplitude limiting circuit 51 outputs the read sample value sequence R, as they are, as the aforementioned amplitude limited read sample value sequence $R_{LIM}$. In addition, when each sample value of the read sample value sequence R is greater than the amplitude limiting value $T_h$, the amplitude limiting circuit 51 outputs the amplitude limiting value $T_h$ itself as the amplitude limited read sample value sequence $R_{LIM}$. On the other hand, when each sample value of the read sample value sequence R is less than the amplitude limiting value $-T_h$, the amplitude limiting circuit 51 outputs the amplitude limiting value $-T_h$ itself as the amplitude limited read sample value sequence $R_{LIM}$. Incidentally, as shown in FIG. 2A, each of the aforementioned amplitude limiting values $T_h$, $-T_h$ is set to such a value as allows only the read sample value sequence R corresponding to 3T, which is the shortest level inversion interval (hereinafter referred to as the run length) in the 8/16 modulation, not to be limited by the amplitude limitation.

The high frequency enhancing filter 52 comprises unit delay elements $FD_1$–$FD_4$, coefficient multipliers $M_1$, $M_2$, $M_3$, $M_4$, and an adder AD for adding each of the outputs of these coefficient multipliers. The unit delay elements $FD_1$–$FD_4$ delays each of the input values by one clock period of the aforementioned channel clock and then outputs the values. The coefficient multipliers $M_1$, $M_2$, $M_3$, $M_4$ have multiplication coefficients [–k, k, k, –k], respectively. That is, the high frequency enhancing filter 52 is a transversal filter with tap coefficients [–k, k, 0, k, –k]. Such a configuration allows the high frequency enhancing filter 52 to generate the high frequency enhanced read sample value sequence in which only the level of the high frequency components of the aforementioned amplitude limited read sample value sequence $R_{LIM}$ is enhanced and to supply the high frequency enhanced read sample value sequence to an adder 54.

The adder 54 adds such high frequency enhanced read sample value sequence and the aforementioned read sample value sequence R that are supplied after having been delayed by two periods of the channel clock by means of a delay element 53. Then, the adder 54 outputs the resulting value obtained by the addition as the equalization corrected read sample value sequence $R_H$.

Next, the operation of the aforementioned waveform equalizer 5 is explained.

In general, the reproducing system for reproducing recorded information from a recording medium has a low pass filter characteristic. This reduces each of the read sample values in the read sample value sequence R corresponding to the run length 3T which has the highest frequency of the signals modulated by 8/16. Accordingly, in order to improve the S/N ratio of the read sample value sequence corresponding to the shortest run length 3T, the high frequency enhancing filter 52 is allowed to increase each of the read sample values of only the read sample value sequence corresponding to the run length 3T. Here, even after the high frequency enhancement by the aforementioned high frequency enhancing filter 52, the value of equalization corrected read sample value sequence $R_H$ at the time of zero-cross $D_0$, as shown in FIG. 2A through 2C, is desirably constant at the zero level. However, since the high frequency enhancing filter 52 is a transversal filter having tap coefficients [–k, k, 0, k, –k] as shown in FIG. 1, for example, the value of the equalization corrected read sample value sequence $R_H$ would vary at the time of zero-cross $D_0$ unless the read sample values at each of the time $D_{-2}$ and $D_{-1}$ in FIGS. 2A through 2C have the same value. In particular, an increase in the aforementioned tap coefficient k to strengthen the high frequency enhancement would cause variation to increase further, leading to an increase in inter symbol interference.

Accordingly, the amplitude limiting circuit 51 supplies the read sample value sequence R, which are equal to or greater than the run length 4T and of which amplitude is limited with the amplitude limiting value $T_h$ and $-T_h$ as shown in FIGS. 2A through 2C to the aforementioned high frequency enhancing filter 52. According to the amplitude limitation by the amplitude limiting circuit 51, as shown in FIG. 2B, when the run length of the read signal is equal to 3T, the interpolated read sample value sequence RR are supplied to the high frequency enhancing filter 52 as they are, as the amplitude limited read sample value sequence $R_{LIM}$. On the other hand, the interpolated read sample value sequence RR corresponding to the run length equal to or greater than 4T lie within the range of the amplitude limiting values from $-T_h$ to $T_h$ near the time of zero-cross $D_0$ but exceed this range at other points of time. Therefore, in the case where the run length of a read signal is equal to or greater than 4T, as shown in FIG. 2C, at points of time other than the aforementioned time of zero-cross $D_0$, the amplitude limited read sample value sequence $R_{LIM}$ of which value is fixed to the amplitude limiting value $-T_h$ or $T_h$ are supplied to the high frequency enhancing filter 52.

With this configuration, in any case where the run length is equal to or greater than 4T, the values at points of time $D_2$ and $D_1$ (or $D_1$, and $D_2$) in FIGS. 2A through 2C become equal to each other. Therefore, even when the aforementioned tap coefficients k are made larger to strengthen the high frequency enhancement, no variation in the equalization corrected read sample value sequence $R_H$ at the time of zero-cross $D_0$ would develop, thus preventing an increase in inter symbol interference.

However, in the case where the modulation scheme of the recorded signals stored in a recording disc 2 is, for example, the (1, 7) modulation where the shortest run length is equal to 2T, the configuration of the waveform equalizer 5 shown in FIG. 1 is not enough to prevent an increase in inter symbol interference.

Figure 3A:
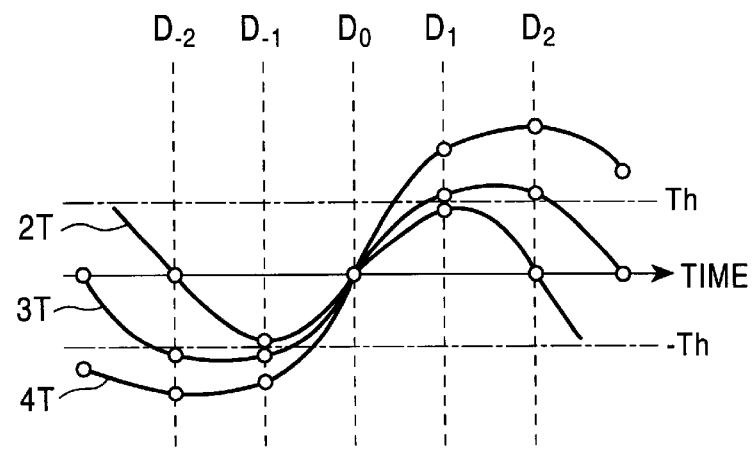
FIGS. 3A through 3C show the read sample value sequence R which are obtained when information signals recorded by being modulated by (1, 7) are read and the amplitude limited read sample value sequence $R_{LIM}$ which are obtained by the waveform equalizer 5.
Figure 3B:
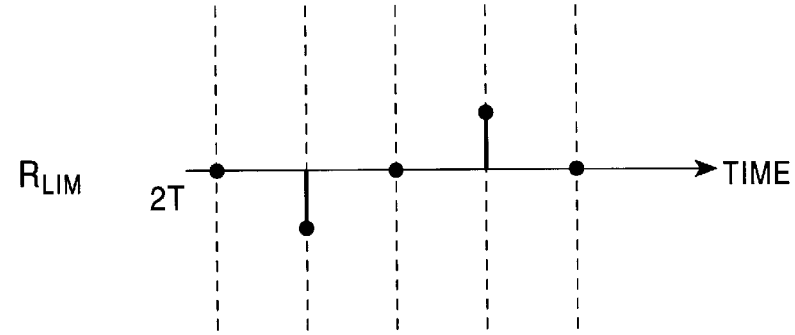
Figure 3C:
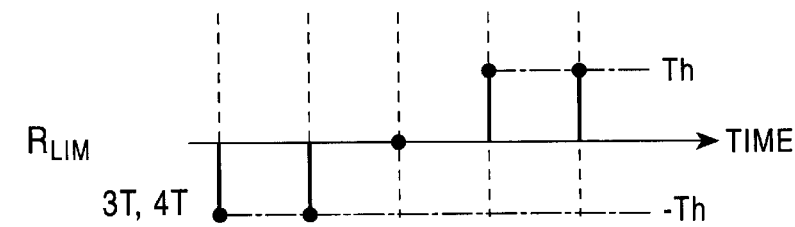

FIGS. 3A through 3C show an example of waveforms of the read sample value sequence R read from the recording disc 2 on which information signals are stored by the modulation scheme in which the shortest run length is equal to 2T.

As shown in FIG. 3C, when the run length is equal to or greater than 3T, the amplitude limiting effect provided by the amplitude limiting circuit 51 makes the amplitude limited read sample values substantially the same at points of time $D_{-2}$, $D_{-1}$, $D_1$, and $D_2$.

However, when the run length becomes equal to 2T, that is, when the shortest level inversion interval becomes equal to or less than twice the clock period of channel clock signals, as shown in FIG. 3B, the amplitude limited read sample values do not have the same value at points of time $D_2$, and $D_{-1}$ (or $D_1$ and $D_2$). Therefore, increasing the value of the aforementioned tap coefficients k to strengthen the high frequency enhancement would further increase the variation in the equalization corrected read sample value sequence $R_H$ at the time of zero-cross $D_0$, leading to an increase in inter symbol interference.

The embodiments of the present invention will be explained below.

Figure 4:
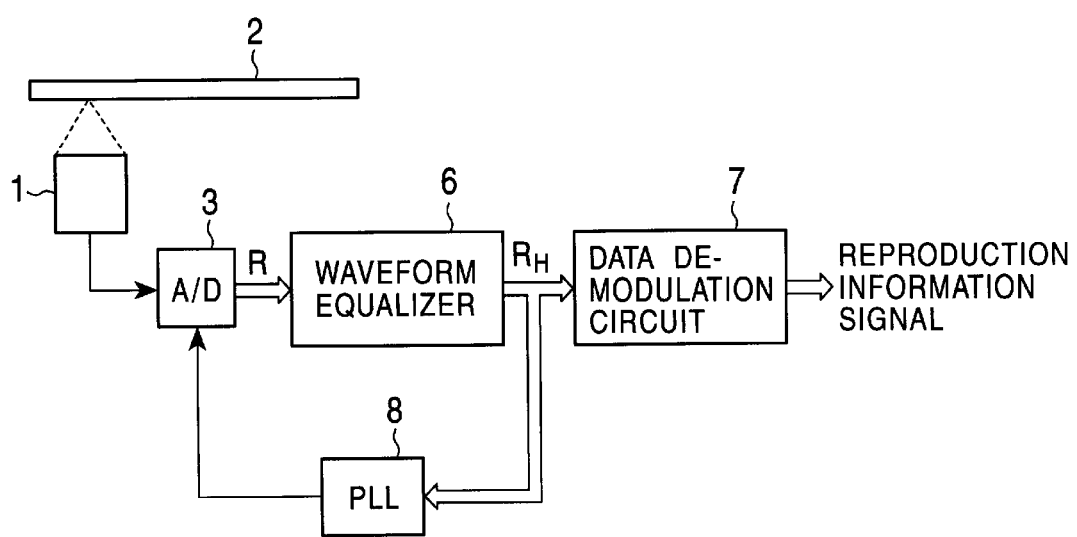
FIG. 4 is a view showing the configuration of a recorded information reproduction device comprising a waveform equalizer 6 according to the present invention.

FIG. 4 is a view showing the configuration of a recorded information reproduction device comprising a waveform equalizer according to the present invention.

Referring to FIG. 4, the pickup 1 supplies the read signal obtained by reading the information signal, whose shortest run length is equal to 2T, for example, recorded on the recording disc 2 by the (1, 7) modulation scheme, to the A/D converter 3. The A/D converter 3 samples such read signals at the timing corresponding to the channel clock signal to supply the read sample value sequence R comprising the series of the resulting sample values to a waveform equalizer 6. Incidentally, the aforementioned channel clock signal is a clock signal having a period of 1T in the information signal modulated by (1, 7). That is, the run length 2T is the length twice the clock period of the channel clock signal.

The waveform equalizer 6 supplies the equalization corrected read sample value sequence $R_H$ that have been obtained by performing high frequency enhancement on the read sample value sequence R to an information demodulation circuit 7 and a PLL (Phase Locked Loop) circuit 8, respectively. The information demodulation circuit 7 demodulates the equalization corrected read sample value sequence $R_H$ by a (1, 7) demodulation to restore the original information signal and output the signal as a reproduced information signal. The PLL circuit 8 generates a channel clock signal in which a phase error that developed in the aforementioned equalization corrected read sample value sequence $R_H$ is corrected, and then supplies the channel clock signal to the aforementioned A/D converter 3.

Figure 5:
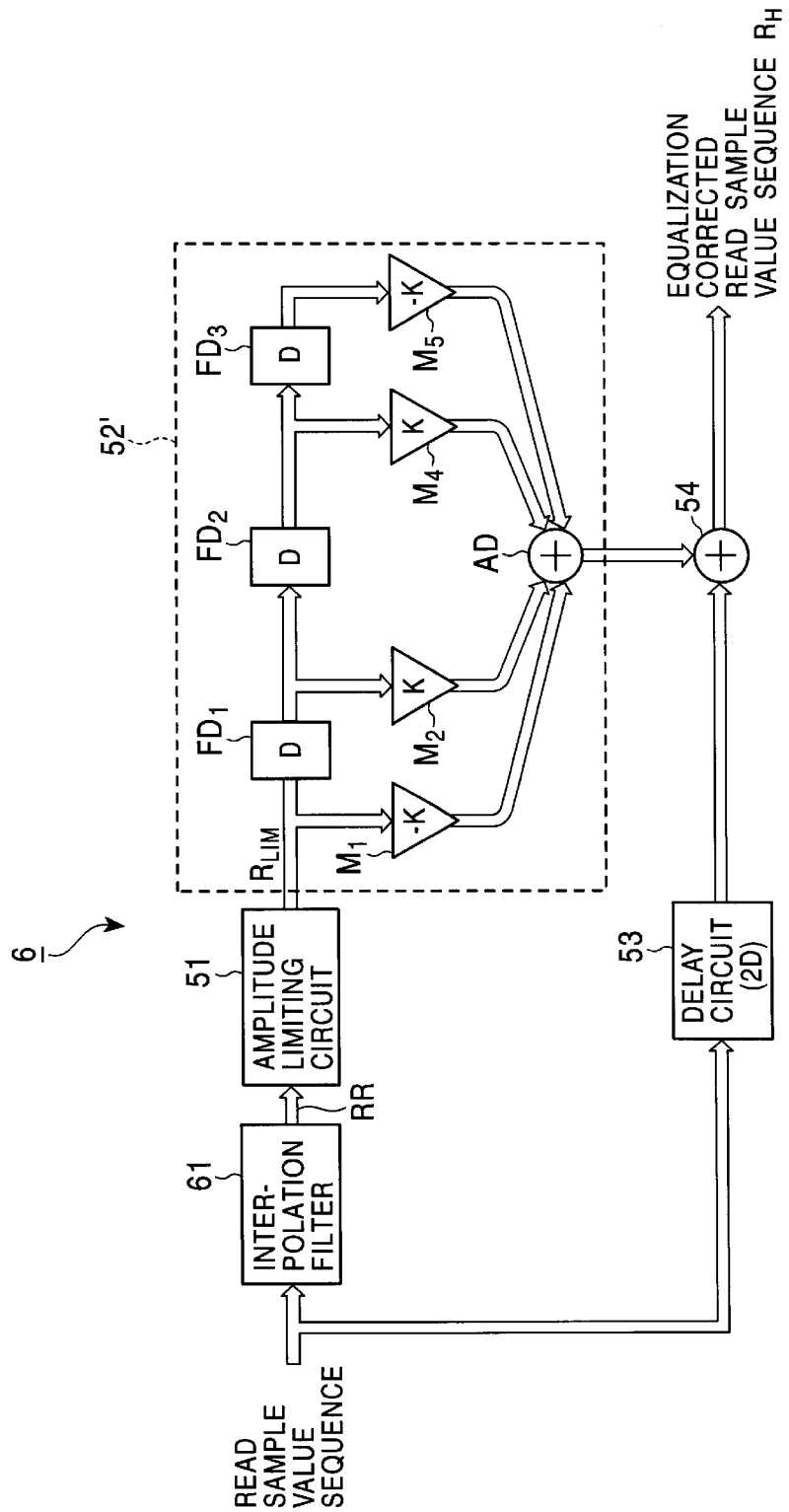
FIG. 5 is a view showing an example of the internal configuration of the waveform equalizer 6 according to the present invention.

FIG. 5 is a view showing the internal configuration of the waveform equalizer 6 according to the present invention.

Referring to FIG. 5, an interpolation filter 61 performs an interpolation operation on the read sample value sequence R supplied by the aforementioned A/D converter 3. By the interpolation operation, the interpolation filter 61 determines a series of sample values that would be obtained by sampling the read signals read from the aforementioned recording disc 2 at the intermediate timing between each clock timing of the aforementioned channel clock signals. Then, the interpolation filter 61 obtains the interpolated read sample value sequence RR that are interpolated by including the determined series of the sample values in the aforementioned read sample value sequence R, and then supplies the interpolated read sample value sequence RR to the amplitude limiting circuit 51.

In the interpolation filter 61, the interpolation computation process consumes the period of:

$(n+0.5)T$ where n is an even number and T is the period of the channel clock.

Therefore, the following explanation is made presuming that the interpolation operation processing by the interpolation filter 61 is associated with a delay time of 0.5T.

The amplitude limiting circuit 51 supplies the amplitude limited read sample value sequence $R_{LIM}$ that have been obtained by limiting the amplitude of the interpolated read sample value sequence RR with the amplitude limiting values $T_h$ and $-T_h$ to the high frequency enhancing filter 52'. That is, in the case where each of the read sample values of the interpolated read sample value sequence RR lies within the range of aforementioned amplitude limiting values $-T_h$ to $T_h$, the amplitude limiting circuit 51 outputs the interpolated read sample value sequence RR as they are as the aforementioned amplitude limited read sample value sequence $R_{LIM}$. In addition, in the case where each of the read sample values of the interpolated read sample value sequence RR is greater than the amplitude limiting value $T_h$, the amplitude limiting value $T_h$ itself is outputted as the amplitude limited read sample value sequence $R_{LIM}$. On the other hand, in the case where each of the read sample values of the interpolated read sample value sequence RR is less than the amplitude limiting value $-T_h$, the amplitude limiting value $T_h$ itself is outputted as the amplitude limited read sample value sequence $R_{LIM}$. In this scheme, each of the aforementioned amplitude limiting values $T_h$ and $-T_h$ is set to a value such that only the interpolated read sample value sequence RR corresponding to the shortest run length 2T are not limited by the amplitude limitation. That is, the amplitude limiting value $T_h$ is greater than the maximum value in the region corresponding to the run length 2T in the interpolated read sample value sequence RR. On the other hand, the amplitude limiting value $-T_h$ is less than the minimum value in the region corresponding to the run length 2T.

The high frequency enhancing filter 52' comprises unit delay elements $FD_1$ –$FD_3$, coefficient multipliers $M_1$, $M_2$, $M_3$, $M_4$, and an adder AD for adding the output of each of these coefficient multipliers. Each of the unit delay elements $FD_1$ –$FD_3$ delays an inputted value by one clock period of the aforementioned channel clock and then outputs the value. The coefficient multipliers $M_1$, $M_2$, $M_3$, $M_4$ have multiplication coefficients [-k, k, k, -k], respectively. That is, the high frequency enhancing filter 52' is a transversal filter with the tap coefficients [-k, k, k, -k]. According to such a configuration, the high frequency enhancing filter 52' generates a high frequency enhanced read sample value sequence in which increased is only the level of sample value sequence corresponding to the run length 2T in the aforementioned amplitude limited read sample value sequence $R_{LIM}$. Then, the high frequency enhancing filter 52' supplies the high frequency enhanced read sample value sequence to the adder 54. The adder 54 adds the high frequency enhanced read sample value sequence and the aforementioned read sample value sequence R supplied after being delayed by two periods of the channel clock by the delay element 53. Then, adder 54 outputs the resulting value of the addition as the equalization corrected read sample value sequence $R_H$.

Next, the operation of the aforementioned waveform equalizer 6 is explained with reference to FIGS. 6A through 6C.

Figure 6A:
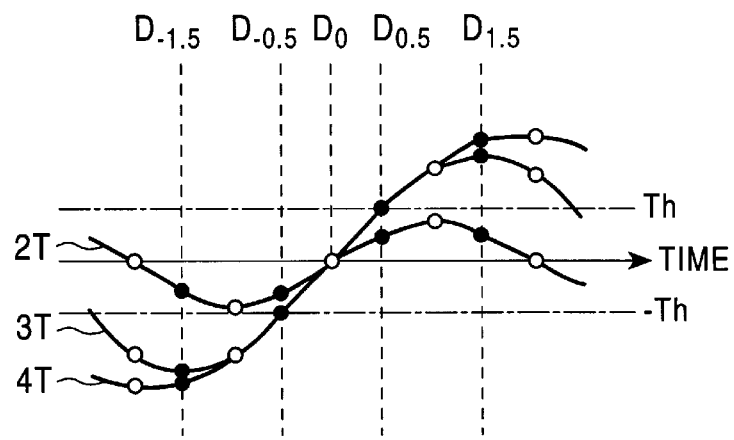
FIGS. 6A through 6C show the read sample value sequence R which are obtained when information signals recorded by being modulated by (1, 7) are read and the amplitude limited read sample value sequence $R_{LIM}$ which are obtained by the waveform equalizer 6 according to the present invention.

Incidentally, the white points shown in FIG. 6A show the respective read samples in the read sample value sequence R, while the black points show interpolated read samples in the interpolated read sample value sequence RR obtained by means of the interpolation filter 61. Incidentally, in FIG. 6A, in each of the cases of run lengths 2T to 4T, these points show the read samples in the read sample value sequence R and the interpolated read samples in the interpolated read sample value sequence RR, respectively.

As shown in FIG. 6A, each of the amplitude limiting values $T_h$ and $-T_h$ in the amplitude limiting circuit 51 is set to a value such that the amplitude of only the interpolated read sample value sequence RR corresponding to the shortest run length 2T is not limited. Therefore, as shown in FIG. 6B, in the case of the run length being equal to 2T, the interpolated read sample value sequence RR are supplied as they are to the high frequency enhancing filter 52' as the amplitude limited read sample value sequence $R_{LIM}$. On the other hand, in the case of the run length being equal to or greater than 3T, the interpolated read sample value sequence RR lie within the range of the amplitude limiting values $-T_h$ to $T_h$ so long as the sample values are close to the time of zero-cross $D_0$, while exceeding this range at other points of time. Therefore, in the case of the run length being equal to or greater than 3T, as shown in FIG. 6C, the amplitude limited read sample value sequence $R_{LIM}$ which are fixed to the amplitude limiting values $-T_h$ or $T_h$ at points of time other than at the aforementioned time of zero-cross $D_0$ are supplied to the high frequency enhancing filter 52'.

Figure 6B:
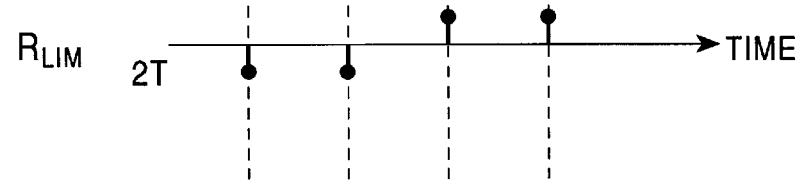
Figure 6C:
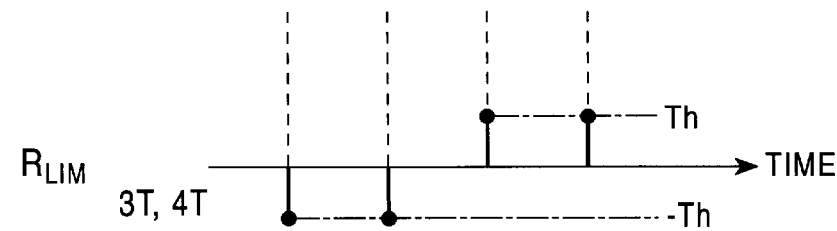

Accordingly, the high frequency enhancing filter 52' determines the equalization corrected read sample values at the time of $D_0$, based on each of the amplitude limited read sample values at the points of time $D_{-1.5}$, $D_{-0.5}$, $D_{0.5}$ and $D_{1.5}$ in the amplitude limited read sample value sequence $R_{LIM}$ as shown in FIGS. 6B and 6C.

That is, supposing that the equalization corrected read sample values at the time of $D_0$ is $Z_0$, $$Z_0 = (-k) \cdot Y_{-1.5} + k \cdot Y_{-0.5} + k \cdot Y_{0.5} + (-k) \cdot Y_{1.5}$$

where $Y_{-1.5}$: the amplitude limited read sample value at the point of time $D_{-1.5}$ in $R_{LIM}$, $Y_{-0.5}$: the amplitude limited read sample value at the point of time $D_{-0.5}$ in $R_{LIM}$, $Y_{0.5}$: the amplitude limited read sample value at the point of time $D_{0.5}$ in $R_{LIM}$, and $Y_{1.5}$: the amplitude limited read sample value at the point of time $D_{1.5}$ in $R_{LIM}$.

As shown FIGS. 6B and 6C, the amplitude limited read sample values at each of the points of time $D_{-1.5}$ and $D_{-0.5}$ (or $D_{0.5}$ and $D_{1.5}$) corresponding to the run length 2T become substantially equal to each other. Moreover, the amplitude limited read sample values at each of the points of time $D_{-1.5}$ and $D_{-0.5}$ (or $D_{0.5}$ and $D_{1.5}$) in the case of the run length equal to or greater than 3T become equal to each other since the values are fixed at the amplitude limiting value $-T_h$ (or $T_h$).

Accordingly, even increasing the value of the tap coefficients k of the high frequency enhancing filter 52' to strengthen the high frequency enhancement allows the equalization corrected read sample value sequence $R_H$ at the time of zero-cross $D_0$ to be maintained at a constant value, thereby causing no increase in inter symbol interference.

As described above, in the waveform equalizer shown in FIG. 5, firstly the interpolated read sample value sequence RR is obtained by interpolating the read sample value sequence R with the values at intermediate timings of the channel clock signal. Then, the amplitude control process is executed to the interpolated read sample value sequence RR, to obtain the amplitude limited read sample value sequence $R_{LIM}$. Then, in the high frequency enhancing filter 52', the amplitude limited read sample values in the aforementioned amplitude limited read sample value sequence $R_{LIM}$ that are occurring at consecutive four points of time are added together after having been weighted respectively at the coefficient multipliers $M_1$ through $M_4$. In this period, read sample values corresponding to the intermediate points of the four points of time are obtained by delaying read sample value sequence R by two clock periods of the channel clock signal. The equalization corrected read sample value sequence $R_H$ is obtained by adding this read sample value to the aforementioned weighted summing value.

However, the number of the amplitude limited read sample values to be weighted and added in the aforementioned high frequency enhancing filter 52' is not limited to four, and the number can be appropriately changed according to the desired filter characteristic so far as the number is an even number equal to or greater than 2. In this case, if we assume that the number of the amplitude limited read sample values is N, the read sample values corresponding to intermediate points of the N amplitude limited read sample values can be obtained by delaying the aforementioned interpolated read sample value sequence R by (N/2) times the clock period of the channel clock signal by means of the delay element 53.

Figure 7:
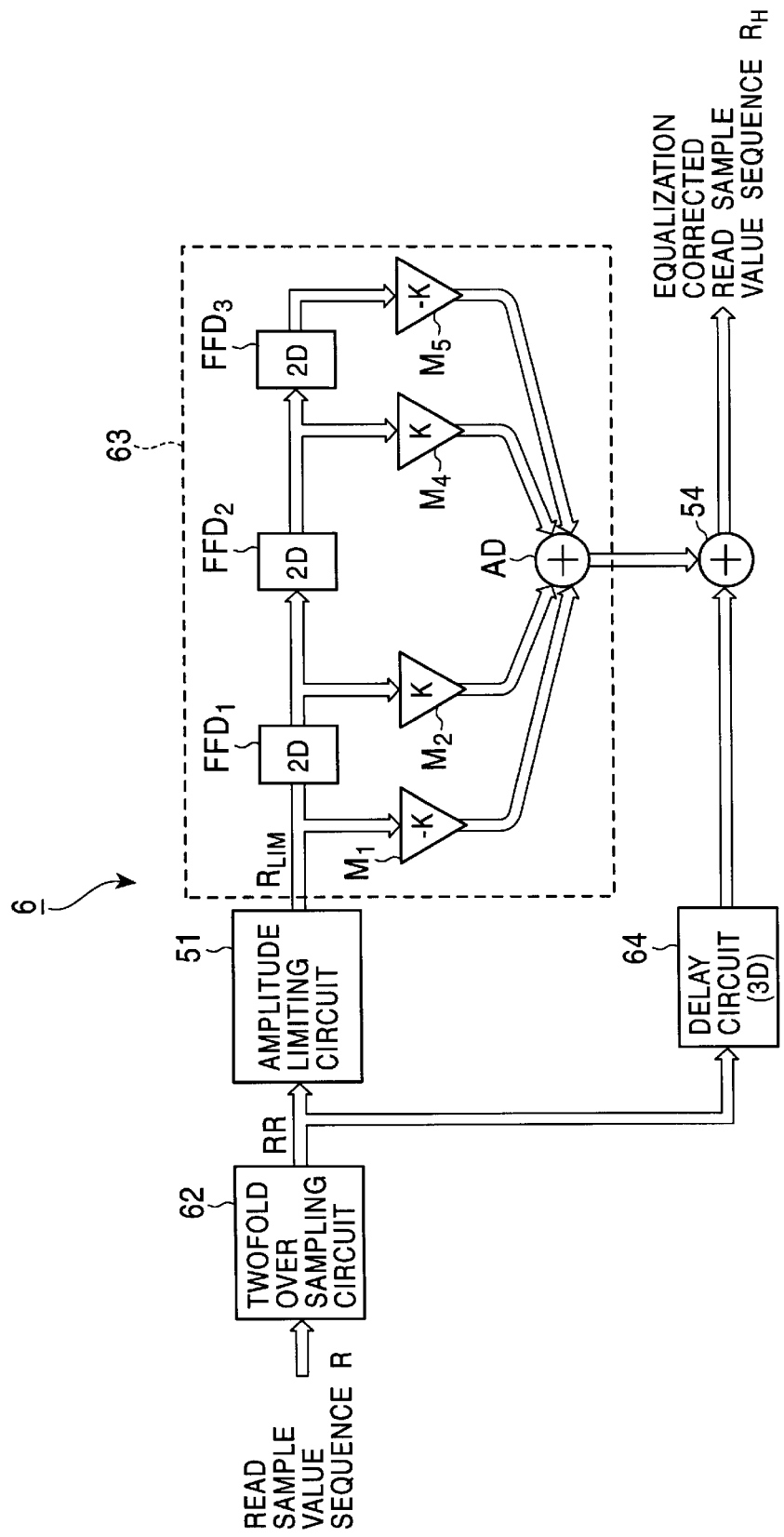
FIG. 7 is a view showing another example of the waveform equalizer 6 according to the present invention.

FIG. 7 is a view showing another example of the configuration of the waveform equalizer 6 according to the present invention.

Referring to FIG. 7, a twofold over sampling circuit 62 performs twofold over sampling processing on the read sample value sequence R supplied from the A/D converter 3. Such processing allows the twofold over sampling circuit 62 to determine the series of sample values that would be obtained at the time of sampling the read signals that have been read from the recording disc 2 at the clock signal having a clock frequency twice the aforementioned channel clock signal. Then, the twofold over sampling circuit 62 supplies such sample value sequence to the amplitude limiting circuit 51 as the interpolated read sample value sequence RR.

The amplitude limiting circuit 51 supplies the amplitude limited read sample value sequence $R_{LIM}$ that have been obtained by limiting the amplitude of the interpolated read sample value sequence RR with the amplitude limiting values $T_h$ and $-T_h$ to a high frequency enhancing filter 63. That is, in the case where each of the read sample values of the interpolated read sample value sequence RR is less than the aforementioned amplitude limiting value $T_h$ and is greater than the amplitude limiting value $-T_h$, the amplitude limiting circuit 51 outputs the interpolated read sample value sequence RR as they are as the aforementioned amplitude limited read sample value sequence $R_{LIM}$. In addition, in the case where each of the read sample values of the interpolated read sample value sequence RR is greater than the aforementioned amplitude limiting value $T_h$, the amplitude limiting circuit 51 outputs the amplitude limiting value $T_h$ itself as the aforementioned amplitude limited read sample value sequence $R_{LIM}$. On the other hand, in the case where each of the read sample values of the interpolated read sample value sequence RR is less than the aforementioned amplitude limiting value $-T_h$, the amplitude limiting circuit 51 outputs the amplitude limiting value $-T_h$ itself as the aforementioned amplitude limited read sample value sequence $R_{LIM}$. Each of the aforementioned amplitude limiting values $T_h$ and $-T_h$ is set to a value such that only the interpolated read sample value sequence RR corresponding to the shortest run length 2T are not limited by the amplitude limitation.

The high frequency enhancing filter 63 comprises delay elements $FFD_1$–$FFD_3$, coefficient multipliers $M_1$, $M_2$, $M_3$, $M_4$, and an adder AD for adding each of the outputs of these coefficient multipliers as shown in FIG. 7. Each of the delay elements $FFD_1$–$FFD_3$ captures inputted values in sequence at the clock timing of a frequency twice the aforementioned channel clock signal and delays the values by one clock period of the aforementioned channel clock signal and then outputs the values. The coefficient multipliers $M_1$, $M_2$, $M_3$, $M_4$ have multiplication coefficients [−k, k, k, −k], respectively. That is, the high frequency enhancing filter 63 is a transversal filter with tap coefficients [−k, 0, k, 0, k, 0, −k].

According to such a configuration, the high frequency enhancing filter 63 generates a high frequency enhanced read sample value sequence in which only the level of the sample values corresponding to the run length 2T in the aforementioned amplitude limited read sample value sequence $R_{LIM}$ is increased. Then, the high frequency enhancing filter 63 supplies the high frequency enhanced read sample value sequence to the adder 54. The adder 54 adds the high frequency enhanced read sample value sequence and the aforementioned interpolated read sample value sequence RR supplied after being delayed by three periods of the channel clock by the delay element 64. Then, adder 54 outputs the resulting value of the addition as the equalization corrected read sample value sequence $R_H$.

Next, the operation of the aforementioned waveform equalizer 6 shown in FIG. 7 is explained with reference to FIGS. 8A through 8C.

Incidentally, the white points shown in FIG. 8A show each of the sample values in the interpolated read sample value sequence RR outputted from the twofold over sampling circuit 62 in each of the run lengths 2T to 4T.

As shown in FIG. 8A, each of the amplitude limiting values $T_h$ and $-T_h$ in the amplitude limiting circuit 51 is set to a value such that the amplitude of only the interpolated read sample value sequence RR corresponding to the shortest run length 2T is not limited. Therefore, as shown in FIG. 8B, in the case of the run length being equal to 2T, the interpolated read sample value sequence RR are supplied as they are to the high frequency enhancing filter 63 as the amplitude limited read sample value sequence $R_{LIM}$. On the other hand, in the case of the run length being equal to or greater than 3T, the interpolated read sample value sequence RR lie within the range of the amplitude limiting values $-T_h$ to $T_h$ near the time of zero-cross $D_0$, while exceeding this range at other points of time. Therefore, in the case of the run length being equal to or greater than 3T, as shown in FIG. 8C, the amplitude limited read sample value sequence $R_{LIM}$ which are fixed to the amplitude limiting values $T_h$ or $-T_h$ at points of time other than those near the aforementioned time of zero-cross $D_0$ are supplied to the high frequency enhancing filter 63.

The high frequency enhancing filter 63 determines the equalization corrected read sample values at the time of $D_0$, based on each of the amplitude limited read sample values at the points of time $D_{-1.5}$, $D_{-0.5}$, $D_{0.5}$ and $D_{1.5}$ in the amplitude limited read sample value sequence $R_{LIM}$ as shown in FIGS. 8B and 8C.

That is, supposing that the equalization corrected read sample values at the time of $D_0$ is $Z_0$, $$Z_0 = (-k) \cdot Y_{-1.5} + k \cdot Y_{-0.5} + k \cdot Y_{0.5} + (-k) \cdot Y_{1.5}$$

where $Y_{-1.5}$: the amplitude limited read sample value at the point of time $D_{-1.5}$ in $R_{LIM}$, $Y_{-0.5}$: the amplitude limited read sample value at the point of time $D_{-0.5}$ in $R_{LIM}$, $Y_{0.5}$: the amplitude limited read sample value at the point of time $D_{0.5}$ in $R_{LIM}$, and $Y_{1.5}$: the amplitude limited read sample value at the point of time $D_{1.5}$ in $R_{LIM}$.

In this scheme, as shown FIGS. 8B and 8C, the amplitude limited read sample values at each of the points of time $D_{-1.5}$ and $D_{-0.5}$ (or $D_{0.5}$ and $D_{1.5}$) corresponding to the run length 2T become substantially equal to each other. Moreover, the amplitude limited read sample values at each of the points of time $D_{-1.5}$ and $D_{-0.5}$ (or $D_{0.5}$ and $D_{1.5}$) corresponding to the run length equal to or greater than 3T become equal to each other since the values are fixed at the amplitude limiting value $-T_h$ (or $T_h$).

Accordingly, even increasing the value of the tap coefficients k of the high frequency enhancing filter 63 to strengthen the high frequency enhancement allows the equalization corrected read sample value sequence $R_H$ at the time of zero-cross $D_0$ to be maintained at a constant value, thereby causing no increase in inter symbol interference.

Incidentally, in the embodiment shown in FIG. 7, the twofold over sampling circuit 62 performs twofold over sampling processing on the read sample value sequence R supplied from the A/D converter 3. However, the present invention is not limited to such a configuration. For example, in place of using the twofold over sampling circuit 62, it may also be acceptable to sample read values with a clock signal having a frequency twice that of the aforementioned channel clock signal at the stage of the A/D converter 3.

In addition, the waveform equalizer shown in FIGS. 5 or 7 supplies the sample value sequence corresponding to the center tap of the high frequency enhancing filter 52' (or 63) to the adder 54 via the delay element 53 (or 64). That is, only the sample value sequence corresponding to the center tap in the high frequency enhancing filter 52' (or 63) is reflected on the equalization corrected read sample value sequence $R_H$ without limiting the amplitude thereof by the aforementioned amplitude limiting circuit 51. However, a limitation may be imposed on the sample value sequence corresponding to the center tap by means of the aforementioned amplitude limiting circuit 51.

Figure 9:
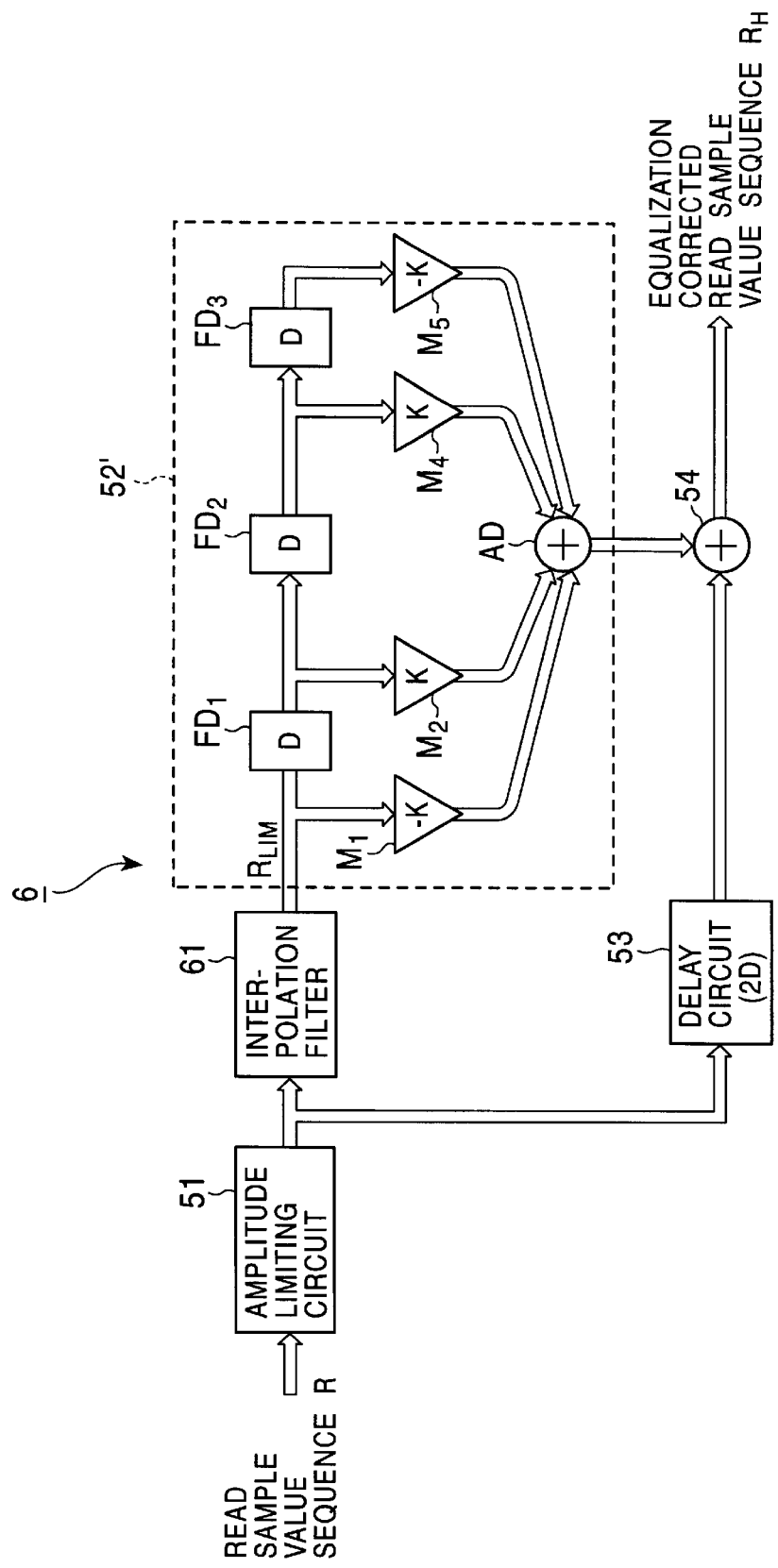
FIG. 9 is a view showing a modification of the waveform equalizer 6 shown in FIG. 5.
Figure 10:
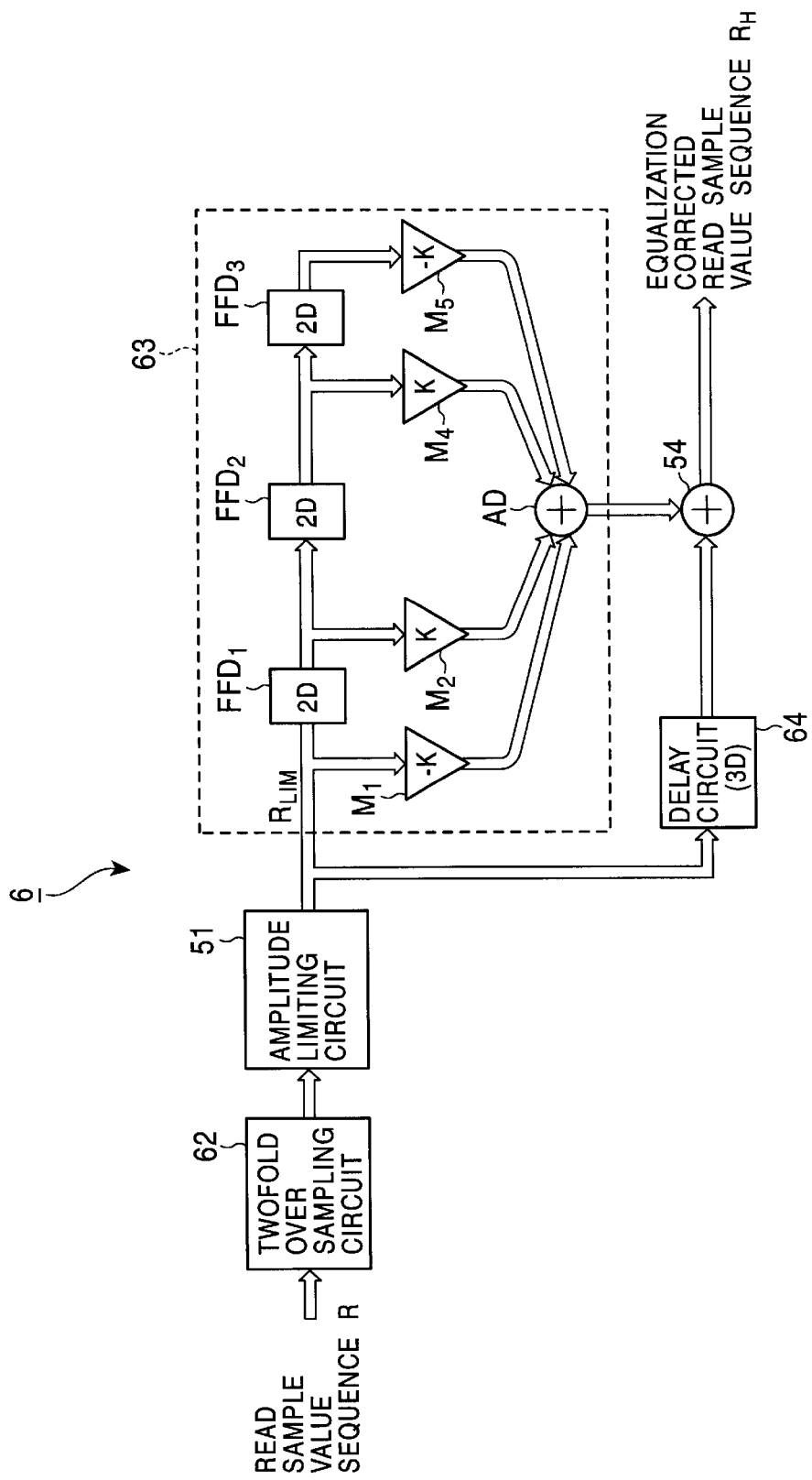
FIG. 10 is a view showing a modification of the waveform equalizer 6 shown in FIG. 7.

FIGS. 9 and 10 is a view showing modified examples of the waveform equalizer developed in view of the aforementioned points. Incidentally, FIG. 9 shows a modified example of the waveform equalizer shown in FIG. 5, while FIG. 10 shows a modified example of the waveform equalizer shown in FIG. 7.

In addition, in the high frequency enhancing filter 63 shown in FIGS. 7 and 10, it is possible to obtain the sample value sequence corresponding to the aforementioned center tap in the filter.

Figure 11:
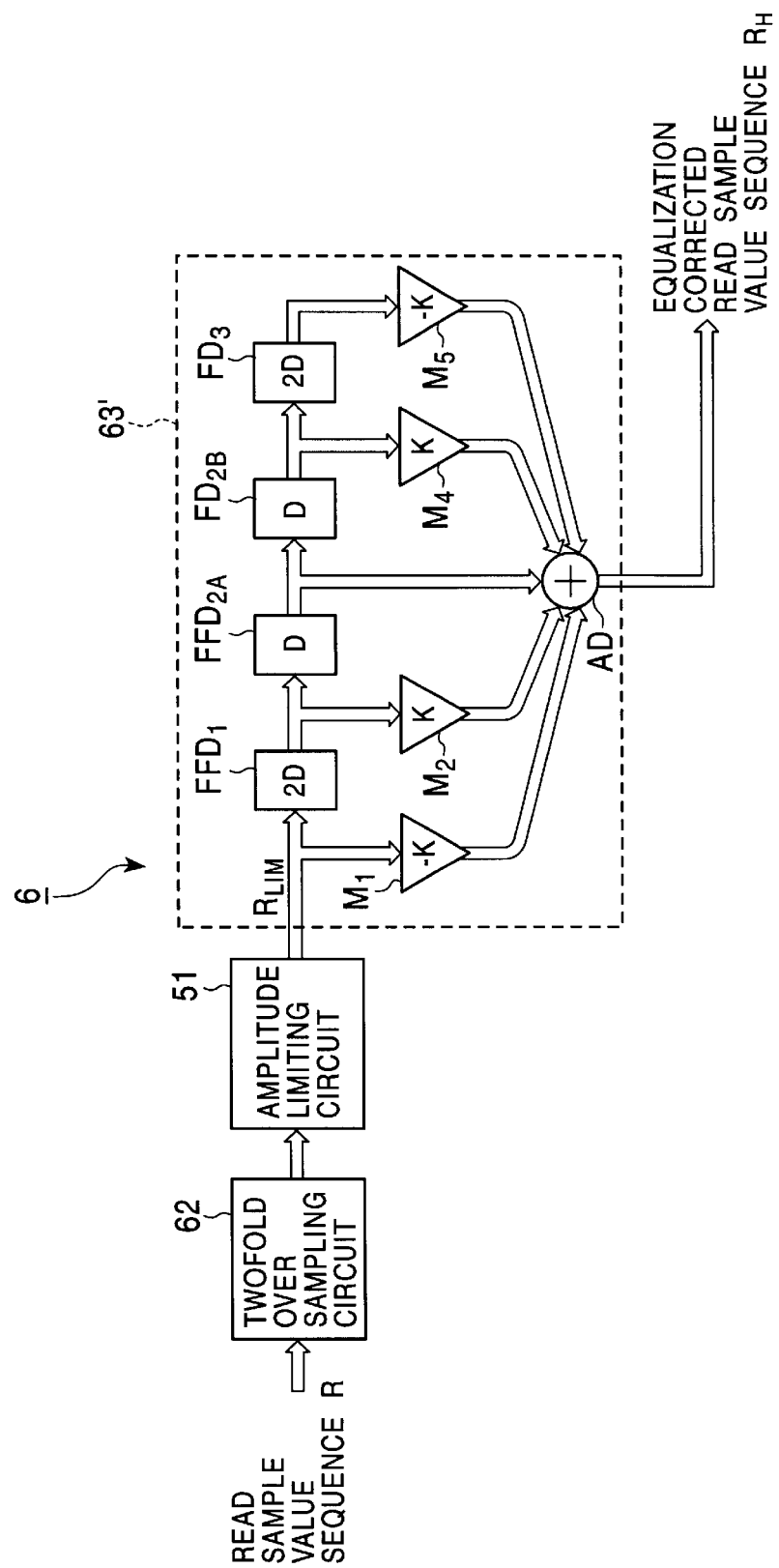
FIG. 11 is a view showing a modification of the waveform equalizer 6 shown in FIGS. 7 and 10.

FIG. 11 is a view showing a modified example of the waveform equalizer shown in FIGS. 7 and 10, developed in view of such a point.

The high frequency enhancing filter 63' shown in FIG. 11 divides the delay element $FFD_2$ of the high frequency enhancing filter 63 shown in FIGS. 7 and 10 into the two stages of delay elements $FFD_{2A}$ and $FFD_{2B}$ and supplies the output of the delay element $FFD_{2A}$ to the adder AD.

Each of the delay elements $FFD_{2A}$ and $FFD_{2B}$ is a delay element for capturing an inputted value at the clock timing of a frequency twice that of the aforementioned channel clock signal to supply the value to the following stage. According to such a configuration, the sample value sequence corresponding to the aforementioned center tap are taken out of the delay element $FFD_{2A}$ and are directly supplied to the adder AD. Therefore, according to the configuration shown in FIG. 11, even without using the delay element 64 and adder 54 shown in FIGS. 7 and 10, the sample value sequence corresponding to the center tap can be reflected on the equalization corrected read sample value sequence $R_H$.

In the waveform equalizer shown in FIG. 5, the sampled value sequence corresponding to the center tap in the high frequency enhancing filter 52' is only excluded from the sampled values on which the interpolating process by the interpolation filter 61 is executed. However, the apparatus may be designed that the interpolating process by the interpolation filter 61 is only effected to the sample value sequence corresponding to the center tap.

Figure 12:
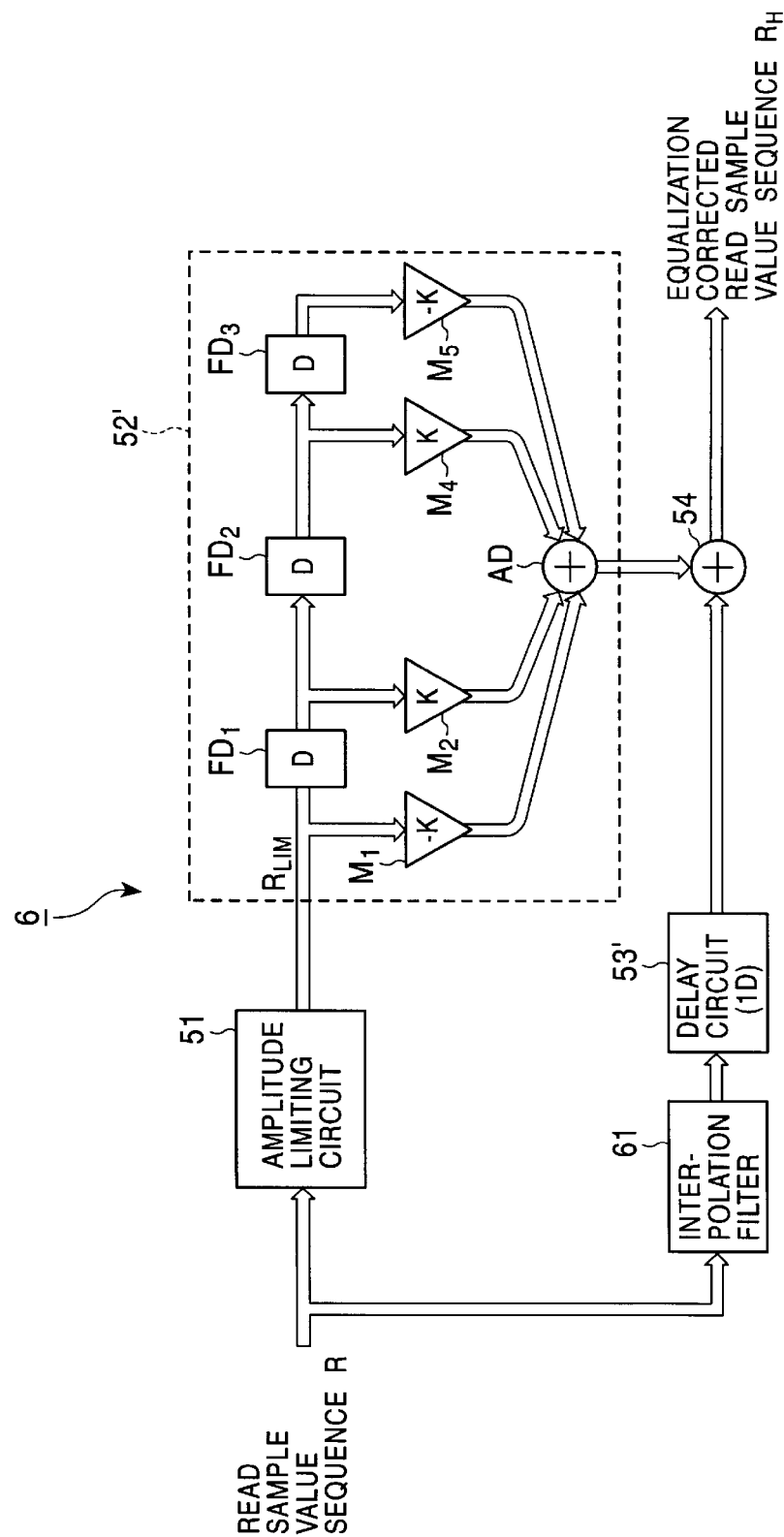
FIG. 12 is a view showing a modification of the waveform equalizer 6 shown in FIG. 5.

FIG. 12 is a diagram showing a variation of the waveform equalizer which is designed in view of this point.

It is to be understood that the functions of the interpolating filter 61, amplitude limiting circuit 51, high frequency enhancing filter 52' and the adder 54, as a single unit, are the same as the functions of these elements shown in FIG. 5.

In FIG. 12, the interpolation filter 61 executes the aforementioned interpolating operation process to the read sample value sequence R supplied from the aforementioned A/D converter 3, and supplies a resultant interpolated read sample value sequence to the delay elements 53'. In this process, the interpolation filter 61 consumes a period of 0.5 time the time interval of the aforementioned channel clock. The delay element 53' delays the interpolated read sample value sequence supplied from the interpolating filter 61 by one period of the channel clock, and supplies the delayed sequence to the adder 54. The amplitude limiting circuit 51, on the other hand, supplies an amplitude limited read sample value sequence $R_{LIM}$ obtained by limiting the amplitude of the read sample value sequence supplied from the A/D converter 3 within the range of amplitude limiting values $T_h$ and $-T_h$ to the high frequency enhancing filter 52'. The high frequency enhancing filter 52' generates a high frequency enhanced read sample value sequence in which the level is increased only in a sample value sequence corresponding to the run length 2T in the amplitude limited read sample value sequence $R_{LIM}$, and supplies it to the adder 54. The adder 54 adds the high frequency enhanced read sample value sequence and the interpolated read sample value sequence that is supplied with the delay of one period of the channel clock by means of the delay element 53' and outputs a result of the addition as the equalization corrected read sample value sequence $R_H$.

As described above, in the waveform equalizer shown in FIG. 12, the amplitude control process is firstly executed to the read sample value sequence R, to obtain the amplitude limited read sample value sequence $R_{LIM}$. Then, in the high frequency enhancing filter 52', the amplitude limited read sample values in the aforementioned amplitude limited read sample value sequence $R_{LIM}$ that are occurring at consecutive four points of time are added together after having been weighted respectively at the coefficient multipliers $M_1$ through $M_4$. In this period, the interpolated read sample values are obtained by interpolating the read sample value sequence R with the values at intermediate timings of the channel clock signal. Then, read sample values corresponding to intermediate points of the aforementioned four points of time are obtained by delaying the interpolated read sample value sequence by one clock period of the channel clock signal. The equalization corrected read sample value sequence $R_H$ is obtained by adding this read sample value to the aforementioned weighted summing value.

With the waveform equalizer shown in FIG. 12, when the number of the amplitude limited read sample values is N, the read sample values corresponding to intermediate points of the N amplitude limited read sample values can be obtained by delaying the aforementioned interpolated read sample value sequence by (N/2−1) times the clock period of the channel clock signal by means of the delay element 53'.

Figure 13:
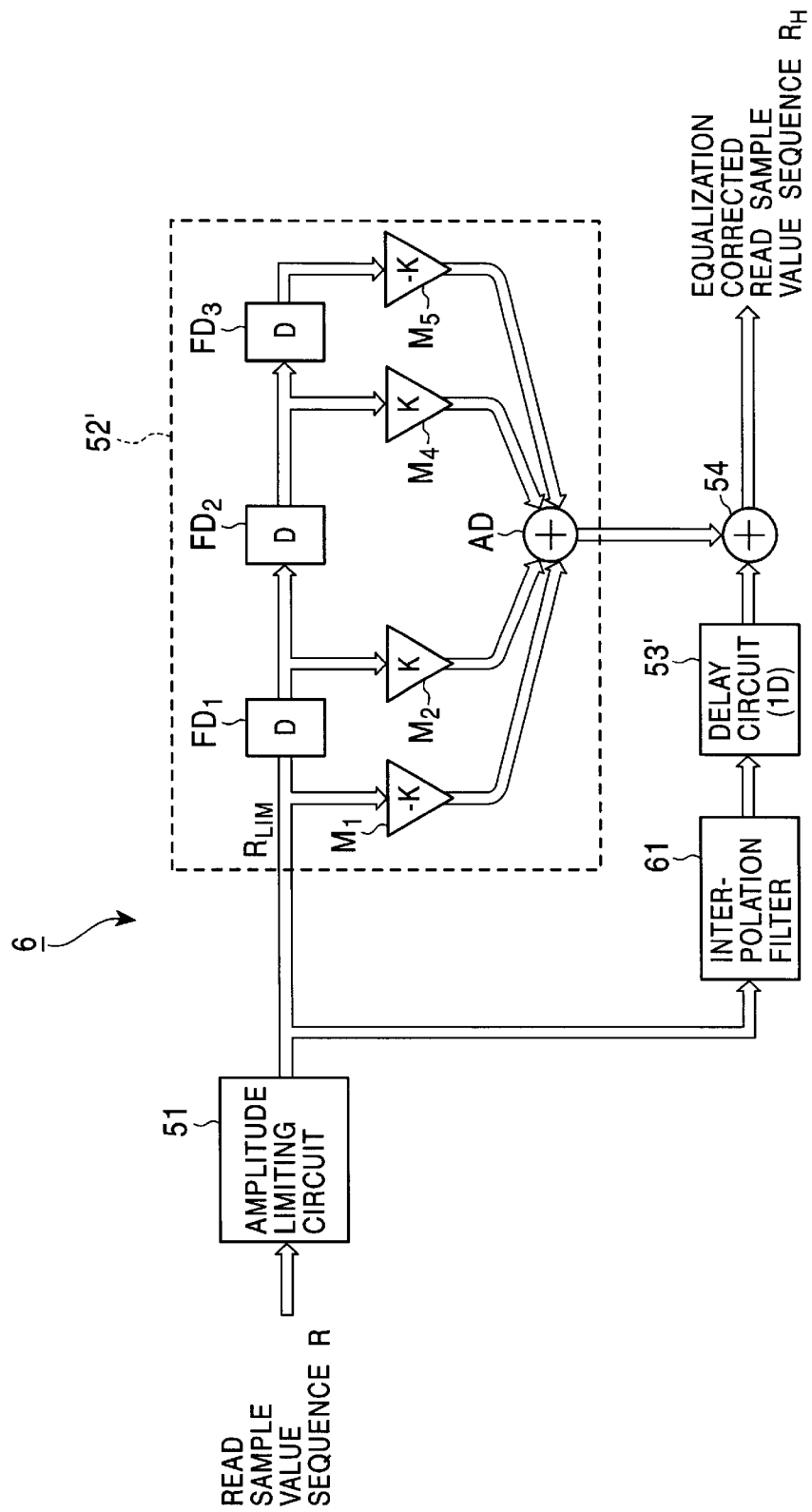
FIG. 13 is a view showing a modification of the waveform equalizer 6 shown in FIG. 12.

Furthermore, in the waveform equalizer shown in FIG. 12, only the sampled value sequence corresponding to the center tap of the high frequency enhancing filter 52', that is, the sampled value sequence corresponding to intermediate positions of the four amplitude limited read sample values to be weighted, is excluded from the target of the amplitude limitation. However, it is possible to adopt, instead of the structure of FIG. 12, the structure shown in FIG. 13 in which the amplitude limitation by the aforementioned amplitude limiting circuit 51 also to the sample value sequence corresponding to the center tap of the high frequency enhancing filter 52'.

In the embodiments described above, explanation has been made to the examples where the waveform equalizer according to the present invention is applied to the information reproducing apparatus which performs the reproduction of the recorded information from a recording medium. However, the application of the present invention is not limited to the information reproducing apparatus. In short, if the transmission system has a characteristic that a high frequency part is reduced, it is possible to effect a high frequency enhancement without increasing the intercode interference by the use of the waveform equalizer according to the present invention.

In the high frequency enhancing filter described above, four amplitude limited read sample values in the amplitude limited read sample value sequence $R_{LIM}$ at four points of time D are added after having been weighted respectively by the coefficient multipliers M1 through M4. It is, however, sufficient to treat at least two amplitude limited read sample values by the weighting and adding process. Furthermore, either an analog signal processing circuit or a digital signal processing circuit can be used for implementation of each of the function modules constituting the waveform equalizer 6 according to the present invention, that is, the amplitude limiting circuit 51, high frequency enhancing filter 52', adder 54, delay element 53, 64, interpolating filter 61, and twofold over sampling circuit 62.

Briefly speaking, as the waveform equalizer according to the present invention, it is sufficient to have a structure that outputs, as equalization corrected read signal ($R_H$), a result summation between an addition value of weighted values of at least two signal levels of the amplitude limited read signal $R_{LIM}$ at consecutive two points of time and a read signal obtained at an intermediate timing of the two points of time.

As specifically described in the foregoing, the waveform equalizer according to the present invention features that signal levels of the amplitude limited read signal that are obtained by limiting in amplitude the read signal at first and second time points are added after having been weighted, and an addition value of a result of this addition and the signal level at an intermediate timing of the first and second time points is outputted as the equalization corrected read signal.

Furthermore, each of the functional modules (the amplitude limiting circuit 51, the high frequency enhancing filter 52', the adders 54, delay element 53 and 64, the interpolation filter 61, and the twofold over sampling circuit 62) constituting the waveform equalizer 6 according to the present invention may be implemented by an analog signal processing circuit or a digital signal processing circuit.

Moreover, in the aforementioned embodiment, the case has been described where the waveform equalizer according to the present invention is applied to an information reproduction device for reproducing recorded information from a recording medium. However, the application of the waveform equalizer is not limited to the information reproduction device. In other words, the waveform equalizer according to the present invention may be implemented in any transmission system having such a characteristic as attenuation at high frequencies, thereby enabling strengthening, of the high frequency enhancement without causing an increase in inter symbol interference.

As described above, according to the waveform equalizer of the present invention, even when the shortest run length of a read signal is not greater than twice the clock period of the channel clock signal, high frequency enhancement can be performed without causing an increase in inter symbol interferece.

What is claimed is:

1. A waveform equalizer for performing a waveform equalizing process on a read signal of a recording medium to produce an equalization corrected read signal, said waveform equalizer comprising:

amplitude limiting means for limiting an amplitude of said read signal to a predetermined amplitude limitation value to produce an amplitude limited read signal;

a filter for summing a weighted value of a signal level of said amplitude limited read signal at a first moment and a weight value of a signal level of said amplitude limited read signal at a second moment subsequent to said first moment, and outputting a filter output signal; and summing means for summing a signal level of said read signal at an intermediate moment between said first and second points of time and said filter output signal of said filter and outputting a summed value as said equalization corrected read signal.

2. A waveform equalizer as claimed in claim 1, wherein said amplitude limitation value is higher than a maximum value of the signal level of said read signal in a section of said read signal having a shortest level inversion interval.

3. A waveform equalizer as claimed in claim 1, wherein said filter is a high frequency enhancing filter which raises a signal level of a high frequency component of said amplitude limited read signal.

4. A waveform equalizer as claimed in claim 3, wherein said high-frequency component is a part of said amplitude limited read signal having a shortest level inversion interval.

5. A waveform equalizer for performing a waveform equalizing process on a read sample value sequence obtained by sampling a read signal of a recording medium at clock timings of a channel clock signal, to produce an equalization corrected read sample value sequence, said waveform equalizer comprising:

interpolating means for obtaining a sampled value sequence, based on said read sample value sequence, that would be obtained when said read signal is sampled at intermediate timings between said clock timings of said channel clock signal, and outputting said sampled value sequence as interpolated read sample value sequence; and amplitude limiting means for limiting an amplitude of said interpolated read sample value sequence to a predetermined amplitude limiting value, to obtain an amplitude limited read sample value sequence;

a filter for summing weighted values of amplitude limited read sample values of said amplitude limited read sample value sequence, and outputting a filter output signal;

delay means for delaying said read sample value sequence, to obtain a delayed read sample value sequence; and summing means for summing said delayed read sample value sequence and said filter output signal, and outputting a summed value as said equalization corrected read sample value sequence.

6. A waveform equalizer as claimed in claim 5, wherein said amplitude limitation value is higher than a maximum value of the signal level of said read signal in a section of said read signal having a shortest level inversion interval.

7. A waveform equalizer as claimed in claim 6, wherein said shortest level-inversion interval is twice a clock interval of said channel clock signal.

8. A waveform equalizer as claimed in claim 7, wherein said interpolating means is a twofold over sampling circuit that obtains said interpolated read sample value sequence by sampling said read signal at clock timings of a frequency twice a frequency of said channel clock signal.

9. A waveform equalizer as claimed in claim 5, wherein said filter is a high frequency enhancing filter that increases a value of a high frequency component of said amplitude limited read sample value sequence.

10. A waveform equalizer as claimed in claim 9, wherein said high-frequency component is a part of said amplitude limited read sample value sequence having a shortest level inversion interval.

11. A waveform equalizer as claimed in claim 5, wherein said filter is a transversal filter having tap coefficients of [−k, k, k, −k].

12. A waveform equalizer for performing a waveform equalizing process on a read sample value sequence obtained by sampling a read signal of a recording medium at clock timings of a channel clock signal, to produce an equalization corrected read sample value sequence, said waveform equalizer comprising:

amplitude limiting means for limiting an amplitude of said read sample value sequence to a predetermined amplitude limiting value, to obtain an amplitude limited read sample value sequence;

a filter for summing weighted values of amplitude limited read sample values of said amplitude limited read sample value sequence, and outputting a filter output signal;

interpolating means for obtaining a sampled value sequence, based on said read sample value sequence, that would be obtained when said read signal is sampled at intermediate timings between said clock timings of said channel clock signal, and outputting said sampled value sequence as an interpolated read sample value sequence;

delay means for delaying said interpolated read sample value sequence, to obtain a delayed interpolated read sample value sequence; and summing means for summing said delayed interpolated read sample value sequence and said filter output signal, and outputting a summed value as said equalization corrected read sample value sequence.

13. A waveform equalizer as claimed in claim 12, wherein said amplitude limitation value is higher than a maximum value of the signal level of said read signal in a section of said read signal having a shortest level inversion interval.

14. A waveform equalizer as claimed in claim 13, wherein said shortest level inversion interval is twice a clock interval of said channel clock signal.

15. A waveform equalizer as claimed in claim 12, wherein said interpolating means is a twofold over sampling circuit that obtains said interpolated read sample value sequence by sampling said read signal at clock timings of a frequency twice a frequency of said channel clock signal.

16. A waveform equalizer as claimed in claim 12, wherein said filter is a high frequency enhancing filter that increases a value of a high frequency component of said amplitude-limited read sample value sequence.

17. A waveform equalizer as claimed in claim 16, wherein said high frequency component is a part of said amplitude limited read sample value sequence having a shortest level inversion interval.

18. A waveform equalizer as claimed in claim 12, wherein said filter is a transversal filter having tap coefficients of [−k, k, k, −k].

19. A waveform equalizer for performing a waveform equalizing process on a read signal obtained by reading out an information signal recorded on a recording medium, comprising:

an A/D converter for obtaining a read sample value sequence by sampling said read signal at clock timings of a channel clock signal;

interpolating means for obtaining a sampled value sequence, based on said read sample value sequence, that would be obtained when said read signal is sampled at intermediate timings between said clock timings, and outputting said sampled value sequence as interpolated read sample value sequence;

amplitude limiting means for limiting an amplitude of said interpolated read sample value sequence to a predetermined amplitude limiting value, to obtain an amplitude limited read sample value sequence; and a filter for performing a filtering process on said amplitude limited sampled value sequence.

20. A waveform equalizer as claimed in claim 19, wherein said amplitude limitation value is higher than a maximum value of the signal level of said read signal in a section of said read signal having a shortest level inversion interval.

21. A waveform equalizer as claimed in claim 20, wherein said shortest level inversion interval is twice a clock interval of said channel clock signal.

22. A waveform equalizer as claimed in claim 19, wherein said interpolating means is a twofold over sampling circuit that obtains said interpolated read sample value sequence by sampling said read signal at clock timings of a frequency twice a frequency of said channel clock signal.

23. A waveform equalizer as claimed in claim 19, wherein said filter is a high frequency enhancing filter that increases a value of a high frequency component of said amplitude limited read sample value sequence.

24. A waveform equalizer as claimed in claim 23, wherein said high frequency component is a part of said amplitude limited read sample value sequence having a shortest level inversion interval.

25. A waveform equalizer as claimed in claim 19, wherein said filter is a transversal filter having tap coefficients of [−k,m k, k, −k1].

26. A waveform equalizer for performing a waveform equalizing process on a read signal obtained by reading out an information signal recorded on a recording medium, to obtain an equalization corrected read signal, said waveform equalizer comprising:

an A/D converter for obtaining a read sample value sequence by sampling said read signal at clock timings of a channel clock signal;

interpolating means for obtaining an interpolated read sample value sequence by interpolating said read sample value sequence with a sampled value sequence that would be obtained when said read signal is sampled at intermediate timings between said clock timings;

amplitude limiting means for limiting an amplitude of said interpolated read sample value sequence to a predetermined amplitude limiting value, to obtain an amplitude limited read sample value sequence; and a filter for performing a filtering process on said amplitude limited sampled value sequence; and an adder for obtaining a summed value of a signal obtained by executing the filtering process by said filter and said read sample value sequence as said equalization corrected read sample value.

27. A waveform equalizer for performing a waveform equalizing process on a read signal of a recording medium to produce an equalization corrected read signal, said waveform equalizer comprising:

an amplitude limiting circuit than limits an amplitude of said read signal to a predetermined amplitude limitation value to produce an amplitude limited read signal;

a filter that sums a weighted value of a signal level of said amplitude limited read signal at a first moment and a weight value of a signal level of said amplitude limited read signal at a second moment subsequent to said first moment, and outputting a filter output signal; and an adder that sums a signal level of said read signal at an intermediate moment between said first and second points of time and said filter output signal of said filter and outputting a summed value as said equalization corrected read signal.

28. A waveform equalizer for performing a waveform equalizing process on a read sample value sequence obtained by sampling a read signal of a recording medium at clock timings of a channel clock signal, to produce an equalization corrected read sample value sequence, said waveform equalizer comprising:

an interpolation filter for obtaining a sampled value sequence, based on said read sample value sequence, that would be obtained when said read signal is sampled at intermediate timings between said clock timings of said channel clock signal, and outputting said sampled value sequence as interpolated read sample value sequence; and an amplitude limiting circuit that limits an amplitude of said interpolated read sample value sequence to a predetermined amplitude limiting value, to obtain an amplitude limited read sample value sequence;

a filter that sums weighted values of amplitude limited read sample values of said amplitude limited read sample value sequence, and outputs a filter output signal;

a delay circuit that delays said read sample value sequence, to obtain a delayed read sample value sequence; and an adder that sums said delayed read sample value sequence and said filter output signal, and outputs a summed value as said equalization corrected read sample value sequence.

29. A waveform equalizer for performing a waveform equalizing process on a read sample value sequence obtained by sampling a read signal of a recording medium at clock, timings of a channel clock signal, to produce an equalization corrected read sample value sequence, said waveform equalizer comprising:

an amplitude limiting circuit that limits an amplitude of said read sample value sequence to a predetermined amplitude limiting value, to obtain an amplitude limited read sample value sequence;

a filter that sums weighted values of amplitude limited read sample values of said amplitude limited read sample value sequence, and outputting a filter output signal;

an interpolation filter that obtains a sampled value sequence, based on said read sample value sequence, that would be obtained when said read signal is sampled at intermediate timings between said clock timings of said channel clock signal, and outputting said sampled value sequence as an interpolated read sample value sequence;

a delay circuit that delays said interpolated read sample value sequence, to obtain a delayed interpolated read sample value sequence; and an adder that sums said delayed interpolated read sample value sequence and said filter output signal, and outputs a summed value as said equalization corrected read sample value sequence.

30. A waveform equalizer for performing a waveform equalizing process on a read signal obtained by reading out an information signal recorded on a recording medium, comprising:

an A/D converter for obtaining a read sample value sequence by sampling said read signal at clock timings of a channel clock signal;

an interpolation filter that obtains a sampled value sequence, based on said read sample value sequence, that would be obtained when said read signal is sampled at intermediate timings between said clock timings, and outputting said sampled value sequence as interpolated read sample value sequence;

an amplitude limiting circuit that limits an amplitude of said interpolated read sample value sequence to a predetermined amplitude limiting value, to obtain an amplitude limited read sample value sequence; and a filter that performs a filtering process on said amplitude limited sampled value sequence.

31. A waveform equalizer for performing a waveform equalizing process on a read signal obtained by reading out an information signal recorded on a recording medium, to obtain an equalization corrected read signal, said waveform equalizer comprising:

an A/D converter for obtaining a read sample value sequence by sampling said read signal at clock timings of a channel clock signal;

an interpolation filter that obtains an interpolated read sample value sequence by interpolating said read sample value sequence with a sampled value sequence that would be obtained when said read signal is sampled at intermediate timings between said clock timings;

an amplitude limiting circuit that limits an amplitude of said interpolated read sample value sequence to a predetermined amplitude limiting value, to obtain an amplitude limited read sample value sequence; and a filter that performs a filtering process on said amplitude limited sampled value sequence; and an adder that obtains a summed value of a signal obtained by executing the filtering process by said filter and said read sample value sequence as said equalization corrected read sample value.

* * * * *

UNITED STATES PATENT AND TRADEMARK OFFICE
CERTIFICATE OF CORRECTION

PATENT NO. : 6,816,547 B1
DATED : November 9, 2004
INVENTOR(S) : Hiroki Kuribayashi It is certified that error appears in the above-identified patent and that said Letters Patent is hereby corrected as shown below:

Column 12,
Line 64, please delete "weight", and insert, -- weighted --.

Column 15,
Line 58, please delete "than", and insert, -- that --.
Line 63, please delete "weight", and insert, -- weighted --.

Column 16,
Line 35, after "clock", please delete the ",".

Signed and Sealed this

Thirty-first Day of May, 2005

JON W. DUDAS
*Director of the United States Patent and Trademark Office*